United States Patent [19]

Hughes et al.

[11] Patent Number: 4,950,046
[45] Date of Patent: Aug. 21, 1990

[54] FIBER OPTIC COUPLER

[75] Inventors: Richard P. Hughes, Kanata; Vincent C. Y. So; Paul J. Vella, both of Ottawa, all of Canada

[73] Assignee: Northern Telecom Limited, Montreal, Canada

[21] Appl. No.: 442,878

[22] Filed: Nov. 28, 1989

Related U.S. Application Data

[63] Continuation of Ser. No. 171,351, Mar. 21, 1988, abandoned, which is a continuation of Ser. No. 757,696, Feb. 22, 1985, abandoned.

[51] Int. Cl.$^5$ ............................................... G02B 6/32
[52] U.S. Cl. ............................... 350/96.18; 350/96.15
[58] Field of Search ........................... 350/96.15, 96.18

[56] References Cited
U.S. PATENT DOCUMENTS 4,274,707  6/1981  Pacey et al. ...................... 350/96.20
4,586,783  6/1986  Campbell et al. ................. 350/96.15
4,618,212  10/1986  Ludington et al. .............. 350/96.15
4,664,732  5/1987  Campbell et al. ................. 156/158
4,728,169  3/1988  Campbell et al. ................. 350/96.15

Primary Examiner—William L. Sikes
Assistant Examiner—Robert E. Wise
Attorney, Agent, or Firm—C. W. Junkin; S. L. Wilkinson.

[57] ABSTRACT

A fiber optic coupler has a cylindrical rod protruding along the apex of an angled block. An optical waveguide is mounted to extend around part of the circumferential of the rod. A transparent body is located on the side of the fiber remote from the rod, and the rod and the body are biased together to bend the fiber around the rod surface and to form an intimate contact between the transparent body and the curved part of the fiber. A light input or output device is positioned to direct light at or receive light from the curved fiber part through the transparent body.

15 Claims, 1 Drawing Sheet

FIBER OPTIC COUPLER

This application is a continuation application of application Ser. No. 171,351 filed on Mar. 21, 1988, in the names of Richard P. Hughes, Vincent Choong-Yeong So, and Paul J. Vella and entitled "Fiber Optic Coupler". Application Ser. No. 171,351 is a continuation of application Ser. No. 757,696 filed Jul. 22, 1985, in the same names. The specification and drawings of application Ser. Nos. 171,351 and 757,696 are hereby incorporated by reference. Applications Ser. Nos. 171,351 and 757,696 are now abandoned.

This invention relates to a fiber optic coupler particularly for minimizing light loss when splicing monomode fibers.

In the fabrication and installation of optical cable spans, lengths of optical waveguide are joined together end-to-end using for example a fusion splice. An example of slicing equipment and an operating procedure for using that equipment are described in U.S. Pat. No. 4,274,707 (Pacey). Particularly for single mode waveguide in which light propagates substantially within a small core of the order of 10 microns in diameter, the cores of the waveguides which are to be spliced must be accurately aligned so that all the light from the core of one waveguide passes into the core of the other waveguide.

One technique for optimizing waveguide end alignment at a splice site is to inject light locally upstream of the site and monitor the light output immediately downstream of the splice site. The two fiber ends at the splice site are then manipulated until light transmission between the two fibers is maximized.

In our co-pending Canadian patent application Ser. No. 453,707 (U.S. patent application Ser. No. 666,626) there is disclosed a local launch and detect system. The system has top and bottom transparent blocks, the top block having an angled surface with an angled protrusion dimensioned to fit in an angled recess in the lower block. The apex of the angle is sufficiently sharp that light propagating along a waveguide located between the two blocks is emitted as a beam at the angle. The device has a detector positioned to monitor the emitted light. A corresponding unit for launching light has a laser emitter in place of the detector.

In the example specifically described in the co-pending specification, the curvature of the protruding angle was set to a desired angle of 146° with a radius of curvature of about 250 microns, this being the diameter also of the coated fiber being spliced.

In the operation of these units it has been found that frequently the fiber retained between the two blocks does not adopt the desired curvature at the apex of the angle. This is disadvantageous for a number of reasons. Firstly the light input device in the case of a local launch unit functions to focus light at a point which assumes a close contact between the fiber and the protruding angle. If the fiber does not in fact contact the block over the critical part of the protruding angle then light launched into the fiber core is not maximized. Similarly detection of maximum light by the local detection unit assumes close contact between the fiber and the protruding angle. Secondly, if the fiber is clamped in a position such that the angle through which the fiber is bent adjacent to the protruding angle is greater than 146° then the fiber is subjected to more stress than it need be.

To overcome this problem there is proposed according to the invention, a fiber optic coupler comprising a cylindrical rod, means for mounting the fiber to extend around a part of the circumference of the rod, a transparent body located on a side of the fiber remote from the rod, spring means for pressing the fiber between the rod and the transparent means to bias the fiber to adopt the radius of curvature of the rod and to form an intimate contact between the transparent body and the curved part of the fiber, and a light input or output device positioned to direct light at or receive light from the curved fiber part through the transparent body.

The rod, preferably made of metal, can adhere in a groove formed in a first block. Similarly the transparent body can form part of a second block, the two blocks having complementary surfaces and being mounted relative to one another inside a box fixed with a lid said spring means can be located between the lid and the first block, this arrangement permitting insertion of a fiber between the blocks with automatic applications of the spring bias to the fiber on closing the lid.

A groove can extend around at least said part of the rod circumference for location of the fiber therein. Aligned slots can be formed in one or both of the blocks whereby when the fiber is stretched taut between a pair of the slots, it is aligned with said groove in the rod. The transparent body can be refractive index matched to the fiber outer casing, the outer coating being resilient to ensure the establishment of said intimate contact between the fiber and the transparent body. The transparent body can have a durable surface facing the fiber to prevent scratching, the durable surface provided by a glass upper layer overlying a mass of transparent epoxy, the light input or output device projecting into said transparent epoxy mass. The light input device can be a laser and for a light output unit, the device can be a PIN or avalanche photodiode. Alternatively the input or output device can be combined with a fiber optic pigtail for guiding light to or from a detector or source respectively located outside the coupler blocks.

When the blocks are located in a position clamping the fiber therebetween, the complementary surfaces thereof should be spaced from one another whereby the contact location is limited to the fiber contacts with the first and second blocks.

Preferably control means are provided to the pressure means whereby to insure that when splicing two fibers together the light output from the output unit is maximum for a fixed input intensity and splice site loss.

An embodiment of the invention will not be described by way of example with reference to the accompanying drawings to which:

Figure 1:
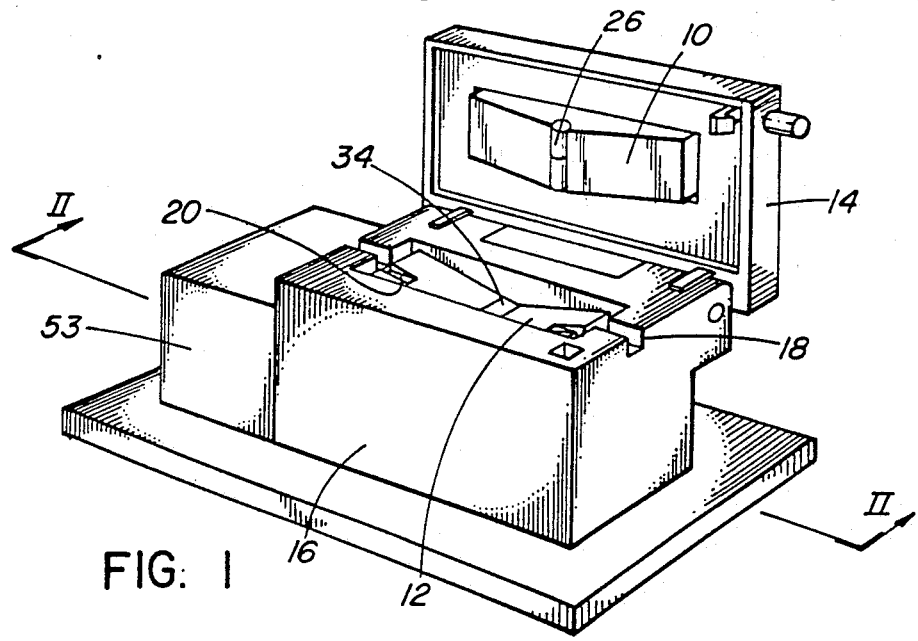
FIG. 1 shows a perspective view of a coupler according to the invention.
Figure 2:
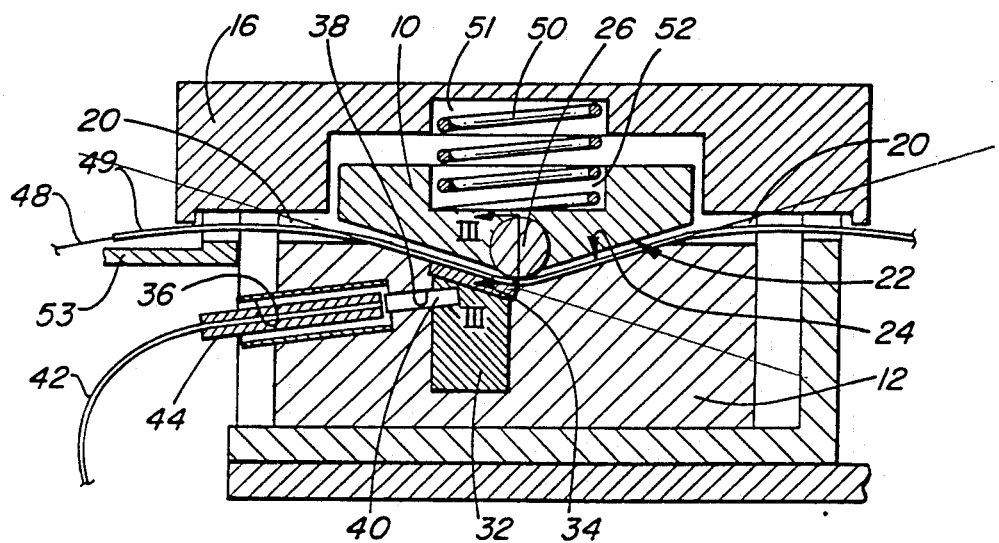
FIG. 2 is a cross-section through the device of FIG. 1.

Referring to the drawings in detail, the unit of FIGS. 1 and 2 has an upper metal block part 10 and a lower metal block part 12, the block part 12 being fixed within a box 14 and the part 10 being fixed to a lid 16. A compression spring 50 extends between the block 10 and the lid 16. Extending into the sides of the box are slots 18 which are aligned with corresponding slots 20 within the lower block 12.

Figure 3:
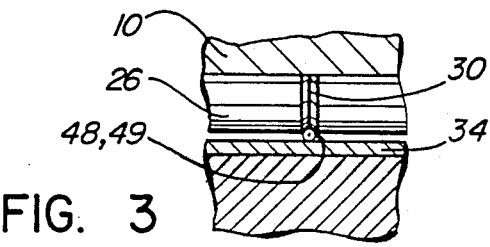
FIG. 3 is a sectional view of the line III—III of FIG. 2.

As shown in sectional view in FIG. 2, the two blocks 10, 12 have generally complementary angled surfaces 22, 24. Extending along the apex and protruding from the angled part of the top block 10 is a cylindrical metal rod 26 which adheres in a cylindrical groove 28 along the apex. A groove 30 (FIG. 3) having a depth of 100 microns and an included angle of 60° extends around the rod 26 in alignment with the slots 20.

The lower block has angle surfaces meeting at 146° with a graded refractive index lens 40 aligned to a line projecting from the apex of the surfaces at an angle 7.5° below the horizontal and 24.3° below the top surface of a glass plate 34. The rod 26 has a radius of curvature of 2.8 millimeters.

The metal lower block 12 has a column 32 of transparent epoxy and a top glass plate 34 flush with the angle face. Extending into the lower block is a bore 36 of ¼ inch diameter which terminates in a further bore 38 of 1/16 inch diameter. The graded refractive index lens 40 which functions as a converging lens is lodged in the smaller bore 36 and a multimode pigtail fiber 42 with protective jacketing is secured by adhesive within a ferrule 44 which it itself mounted by an epoxy within the wider bore 36. The end of the pigtail fiber projects from the ferrule 44 and is aligned with the axis of the lens 40. The end of the lens remote from the fiber projects into the epoxy mass 32. The other end of the fiber 42 is secured in a position in which it receives the output of a GaAs/GaAlAs semiconductor laser 46 (now shown) having an output wavelength of 0.84 microns.

In use an optical fiber 48 having a resilient jacket 49 is positioned so as to extend between the slots 20 whereby it is aligned to the groove 30. The lid 16 is then closed to bias the fiber 48 by means of the spring 50 between the top block 10 and the bottom block 12. The arrangement provides a light-tight enclosure for the portion of the fiber 48 within the box 14. The pressure set on the fiber is determined by the stiffness of spring 50 and the depth of two cylindrical holes 51, 52 in the lid and the upper block 10. The force should not exceed 1 kg; otherwise, damage to fiber coating 49 occurs. A minimum force of 500 grams is required in order to ensure intimate contact of resilient fiber coating 49 with the top of the glass plate 34.

At this pressure, the rod 26 presses the fiber 48 against the planar faces of the lower block immediately adjacent to the angle. This has two effects. Firstly the fiber is caused to adopt the curvature of the rod outer circumference where it contacts the rod at groove 30, and secondly, the resilient coating 49 on the fiber is deformed slightly so as to effect an intimate contact between the fiber and the glass plate 34. The epoxy 36, the glass of plate 34, and the fiber coating material 49 are index matched to one another so that there is minimal light lost from reflection. The glass plate is 1 millimeter thick and the epoxy is available under the trade name EPO+TEK 301-2, being an optically clear epoxy whose index is close to that of the glass and the UV curable acrylate fiber coating.

At the rod 26 a relatively sharply angled region is developed in the fiber, the radius of curvature of the fiber being that of the rod. The lens 40 is positioned so as to focus light from the pigtail fiber 42 directly at the fiber angle which is as sharp an angle as possible commensurate with limiting short term stress on the fiber 48 below that which might result in fracture. If the bend in the fiber had a relatively large radius of curvature, then light injected at one point of the fiber would to some extend, be scattered out of the fiber in the curved portion downstream of where the light enters. By ensuring: (i) that the injected light is properly focussed at the fiber angle; (ii) the apex of the fiber angle is sharp, and (iii) the axis angles of 40 and 42 are 7.5° below horizontal (i.e., 24.5° below the angle of the glass plate surface) light loss downstream of the light entry point is minimized. A low wavelength laser is used since the number of modes which can be launched into a fiber is proportional to the inverse of laser wavelength. In addition, the local launch device is intended for use with a photocell using particularly sensitive silicon photodetectors which have a peak response in the low wavelength regime.

In the detector unit, as described in our co-pending Canadian patent application Ser. No. 453,707 filed May 7, 1984 (U.S. patent application Ser. No. 666,626 filed Oct. 29, 1984) the laser and the lens 40 are replaced by a photocell which can be sited either within the coupler or at the remote end of a pigtail fiber such as fiber 42. Also, as described in the co-pending application, a single unit can be constructed with a pair of detectors, a p air of light emitters or a combination of a detector and a light emitter. As further described in that patent application, a skeletal unit can be made so as to accept plug-in emitting or detecting devices.

The choice of fiber angle is important since it is a compromise between minimizing light beam size and minimizing fiber stress. The fiber included angle of 146°, an angle between the fiber and the axis of the launch or detection device of 24.5° and a rod diameter of 2.8 millimeters recited in this specific example, are values which depend on the relative refractive indexes of the fiber, the jacket material and the coupler block. They depend also on the ability of the fiber to withstand bending stresses. For other types of fiber, the fiber included angle, the angle between the fiber and the electro-optic device, and the apex radius will be different.

When using the launch and detection couplers in conjunction with a splicing equipment, the couplers are fixed on either side of the splicing equipment. An upstream fiber is led through the a light input or injection coupler into a splicing zone where the end of the fiber is clamped. The downstream fiber is led through a light output or monitoring coupler has its end portion is clamped at the splicing zone. In the splicing zone one of the fiber ends can be moved incrementally in x, y and z directions using a micromanipulator unit. In use light is launched from the laser into the pigtail fiber 42 housed within a shield 53 as shown in FIG. 1 and at the lens 40 is focussed at the fiber core on the upstream side of the splice site. In turn, light is monitored by a silicon photodetector within the downstream detector unit and directed to a level detection circuit. Although manipulation can be achieved manually, the detector output can be used directly to manipulate the position of one or other of the fiber ends at the splice zone. A suitable control circuit is described in our U.S. Pat. No. 4,720,163. Subsidiary control loops can be used at each coupler to ensure that pressure on the fibers at each coupler is maintained at a value which maximizes the detector output. The ensure accuracy of monitoring, the output level of the laster is stabilized and detector sensitivity is made dependent on the laser output level to compensate for changes in lasing efficiency.

The embodiments of the invention in which an exclusive property or privilege is claimed are defined as follows:

1. A fiber optic coupler comprising:

a cylindrical rod;
means for mounting a fiber having a core, a cladding and a resilient coating to extend along a path around a part of the circumference of the rod;
a rigid transparent body having a substantially flat surface located on a side of the path remote from the rod;
means for pressing the fiber between the rod and the substantially flat surface and into intimate contact with the rod and with a localized contact region of the substantially flat surface; and
a lens positioned to direct light into the fiber core and to receive light from the fiber core, said light passing through the localized contact region of the substantially flat surface of the transparent body.

2. A coupler as claimed in claim 1 in which a fiber locating groove extends around at least a part of the circumference of the rod in a plane perpendicular to the axis of the rod.

3. A coupler as claimed in claim 1 in which the transparent body comprises a glass plate and a mass of transparent epoxy refractive index matched to said glass plate, the glass plate overlying the mass of epoxy and wherein the lens projects into the epoxy mass.

4. A coupler as claimed in claim 1 further comprising a light input device aligned with the lens to focus emitted light at the core of the fiber adjacent said substantially flat surfaces of the transparent body.

5. A coupler as claimed in claim 1 in which the rod is fixed within an angled block and the transparent body is fixed within a second angled block, a protruding angle of the first block projecting into and substantially complementary to a recessed angle of the second block.

6. A coupler as claimed in claim 1 in which the rod has a diameter of about 3 millimeters.

7. A fiber optic coupler comprising:
a cylindrical rod;
means for mounting a fiber having a core, a cladding and a resilient coating to extend along a path around a part of the circumference of the rod;
a block having substantially flat surfaces defining a v-groove located on a side of the path remote from the rod, said block comprising a rigid transparent body having a surface defining at least a portion of at least one of the substantially flat surfaces;
means for pressing the rod into the v-groove to press the fiber into intimate contact with the rod and with a localized contact region of said surface of the transparent body; and
a lens positioned to direct light into the fiber core and to receive light from the fiber core, said light passing through the localized contact region of said surface of the transparent body.

8. A fiber optic coupler comprising:
a box;
a block fixed within the box, the block having substantially flat surfaces defining a v-groove and comprising a rigid transparent body having a surface defining at least a portion of at least one of the substantially flat surfaces;
a lid mountable to the box to cover the block;
a cylindrical rod movably mounted to the lid;
the lid and box together defining a pair of apertures for passage of a fiber having a core, a cladding and a resilient coating along a path between the rod and the substantially flat surfaces defining the v-groove and around a part of the circumference of the rod;
resilient biasing means acting between the lid and the rod to press the rod into the v-groove when the lid is mounted to the box to press the fiber into intimate contact with the rod and with a localized contact region of said surface of the transparent body; and
a lens positioned to direct light into the fiber core and to receive light from the fiber core, said light passing through the localized contact region of said surface of the transparent body.

9. A coupler as claimed in claim 8 in which the box and lid comprise a light tight housing.

10. A coupler as defined in claim 8, wherein the resilient biasing means comprises a spring operable between the rod and the transparent body to urge the rod and transparent body together with a force between 500 grams and one kilogram when the lid is mounted to the box.

11. A method for coupling light into and out of an optical fiber comprising:
mounting a fiber having a core, a cladding and a resilient coating to extend along a path around a part of a circumference of a cylindrical rod;
pressing the fiber between the rod and a substantially flat surface of a rigid transparent body and into intimate contact with the rod and with a localized contact region of the substantially flat surface; and
positioning a lens to direct light into the fiber core and to receive light from the fiber core, said light passing through the localized contact region of the substantially flat surface of the transparent body.

12. A method as defined in claim 11, comprising aligning a light input device with the lens to focus emitted light at the core of the fiber adjacent the localized contact region of said substantially flat surface of the transparent body.

13. A method for coupling light into and out of an optical fiber comprising:
mounting a fiber having a core, a cladding and a resilient coating to extend along a path around a part of a circumference of a cylindrical rod;
locating a block having substantially flat surfaces defining a v-groove on a side of the path remote from the rod, said block comprising a rigid transparent body having a surface defining at least a portion of at least one of the substantially flat surfaces;
pressing the rod into the v-groove to press the fiber into intimate contact with the rod and with a localized contact region of said surface of the transparent body; and
positioning a lens to direct light into the fiber core and to receive light from the fiber core, said light passing through the localized contact region of said surface of the transparent body.

14. A method as defined in claim 13, comprising pressing the rod into the v-groove with a force between 500 grams and one kilogram.

15. A fiber optic coupler comprising a cylindrical rod, means for mounting a fiber having a core, a cladding and a resilient coating to extend along a path around a part of the circumference of the rod, a glass plate having a substantially flat surface located on a side of the path remote from the rod, means for pressing the fiber between the rod and the substantially flat surface and into intimate contact with the rod and with the substantially flat surface, a mass of transparent epoxy refractive index matched to the glass plate and underlying the glass plate, and one of a light input device projecting into the mass of epoxy and positioned to direct light into the fiber core at the curved fiber part and a light output device positioned to receive light from the fiber core at the curved fiber part, said light passing through the substantially flat surface.

* * * * *